Sept. 26, 1939.  D. S. FAHRNEY  2,173,832
AIRCRAFT WING
Filed Jan. 10, 1938  2 Sheets-Sheet 1

INVENTOR
DELMER S. FAHRNEY
BY
*Ransom K. Davis*
ATTORNEY

Sept. 26, 1939.   D. S. FAHRNEY   2,173,832
AIRCRAFT WING
Filed Jan. 10, 1938   2 Sheets-Sheet 2

INVENTOR
DELMER S. FAHRNEY
BY
ATTORNEY

Patented Sept. 26, 1939

2,173,832

UNITED STATES PATENT OFFICE 2,173,832

AIRCRAFT WING

Delmer S. Fahrney, United States Navy

Application January 10, 1938, Serial No. 184,144

8 Claims. (Cl. 244—40)

(Granted under the act of March 3, 1883, as amended April 30, 1928; 370 O. G. 757)

This invention relates to an aircraft wing, and has for an object to provide an improved aircraft wing whose angle of attack and whose lifting power may be varied at the will of the pilot or operator.

It has been found that increased turbulence gives increased maximum lift coefficients; that a turbulent boundary layer clings to a surface and resists separation more than a laminar flow; that the lack of separation for turbulent boundary layers implies large values of maximum lift coefficient (see "Aircraft Engineering" of Aug. 1933, pages 169 to 174, inclusive, "The Effect of Turbulence").

This invention provides an easily operable, lightweight means for causing this increased turbulence at the will of the operator, and at the will of the operator eliminating this increased turbulence and restoring the smooth airfoil surface of the wing when low lift and high speed are desired.

It further provides means for increasing the lift and decreasing the speed, and finally for providing a combination wing brake and slot effect to even more greatly slow up the speed and increase the lift at the take-off and landing of the aircraft. The higher angle of attack permitted by this invention increases the climbing rate and the ceiling of the aircraft.

These features are carried out by providing rotatable spinners which may be held at rest entirely within the contour of the airfoil surfaces of the wing, and which may extend above and below the airfoil surfaces while spinning to increase the turbulent boundary layer, or may be held in position extending above and below the airfoil surface of the wing to provide both a slot effect and a wind brake.

With the foregoing and other objects in view, the invention consists in the construction, combination and arrangement of parts hereinafter described and illustrated in the drawings, in which.

Figure 7:
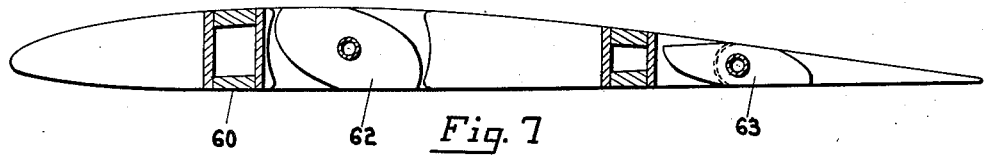
Figure 8:
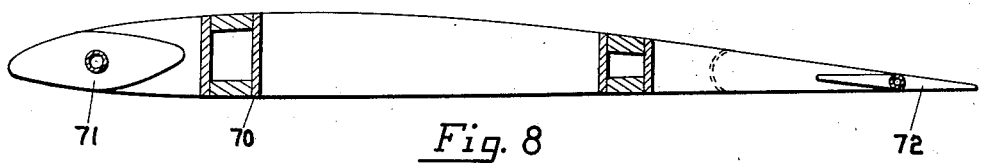
Figure 9:
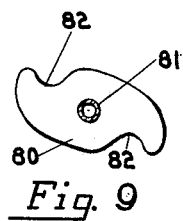

Figs. 4 to 8 inclusive, are schematic sectional views of aircraft wings showing the application of this invention to other locations in the aircraft wing; and Fig. 9 is an end elevational view of another type of spinner which may be used in some forms of this invention.

There is shown at 10 an aircraft wing extending from a fuselage 11. Journaled through the compression ribs 12 of the aircraft by any suitable friction reducing means is a shaft 13 which carries a brake drum 14 within the fuselage 11 so that the shaft 13 may be held against rotation by suitable brake means 15 within the fuselage 11. The brake means 15 is here shown as including a hydraulic cylinder 16 having a tube 17 leading to the brake drum 14, and a piston 18 controlled through link 19 by a brake lever 20. Mounted on the shaft 13 between each of the compression ribs 12 is a spinner 21 of such a shape and size that when at rest it may remain entirely within the contour of the airfoil surface of the wing 10. The spinner 21 has a maximum diameter and a minimum diameter, one of which is substantially longer than the other, the minimum diameter being such that the spinner may be folded within the wing contour in one position, while the maximum diameter is such that when the spinner has been rotated somewhat it will extend beyond the airfoil surface of the wing 10.

The wing 10 is provided with an opening 22 of a diameter greater than the maximum diameter of the spinner 21, whereby the spinner 21 may be permitted to rotate through this opening and have its ends extend above and below the wing airfoil surfaces. The wing 10 may also be provided with sliding covers 23 controllable through cables 24 by a hand lever 25 within the fuselage for closing the opening 22 when the spinner 21 is in the folded position of Fig. 3, and completely restoring the smooth, uninterrupted airfoil surface of the aircraft wing 10.

In operation, when it is desired to increase the lift of the aircraft wing 10, as at the take-off, the hand lever 25 will be utilized to withdraw the covers 23 from their opening 22 and the brake lever 20 will be operated to release the braking effect on shaft 13. As the plane starts to take off the pressure on the bottom of wing 10, being greater than that on top of wing 10, will cause spinner 21 to commence to rotate in a counter-clockwise direction, as viewed in Fig. 3. This will immediately have the effect of increasing the turbulence of the layers along the airfoil surface of the aircraft wing, thereby increasing the lift of the wing, and assisting the aircraft to take off with a shorter run. After the aircraft is in flight the brake lever 20 may be operated to hold the spinner 21 in the folded position shown in Fig. 3 against rotation, and the covers 23 closed to restore the normal airfoil surface of the aircraft, permitting high speed to be attained. When coming in for a landing the covers may be withdrawn and the spinner permitted to rotate to increase the lift of the wing, thereby diminishing the landing speed. The use of the spinner also permits a higher angle of attack, thereby permitting the aircraft to climb more quickly and easily. In addition, it increases the ceiling of the aircraft.

If desired, the brake may be so connected to the joy stick that dropping of one wing, as hitting an air bump in landing, will apply the brake to the spinner on the high wing to diminish its rotation, thereby decreasing its lift compared to the low wing, and more quickly restoring equilibrium. If further slowing down is desired, the brake lever may be actuated to completely stop the rotation of the spinner with its maximum diameter extending vertically or angularly forward, whereby the spinner acts as a wind brake and the opening 22 acts as an airfoil slot to slow up the speed of the aircraft.

Figure 4:
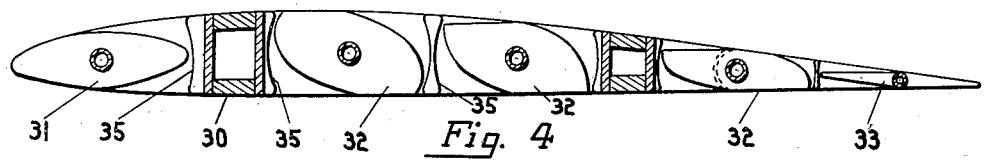

In the form just described the spinner has been shown as located in a chord of the wing where it is substantially the maximum thickness. If desired, a plurality of spinners may be provided in the aircraft wing such as shown at 30, and may include a leading edge spinner 31, several intermediate spinners 32, and a trailing edge spinner 33, suitable controls being provided for permitting the operation of any one or any combination of the spinners, as convenient. As shown in Fig. 4, no covers for the spinner openings 35 are provided, it being contemplated that the covers may be omitted if desired.

Figure 1:
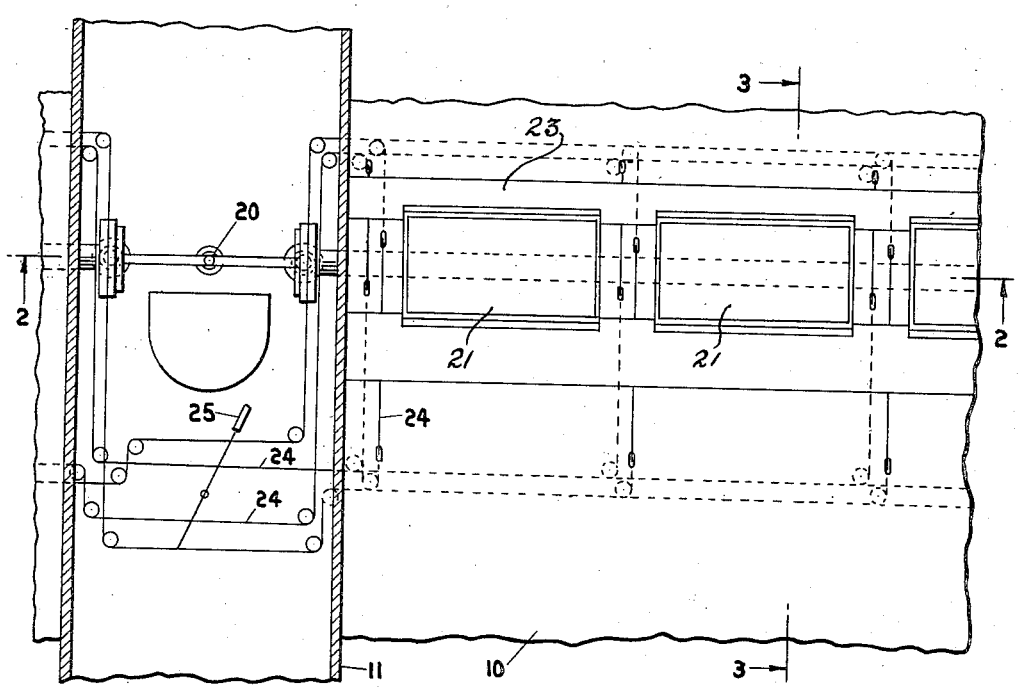
Fig. 1 is a schematic fragmentary top elevation of an aircraft wing to which this invention has been applied.
Figure 2:
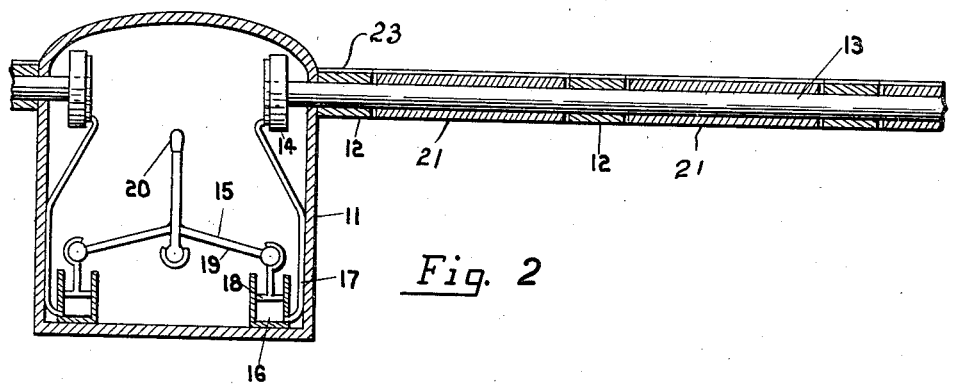
Fig. 2 is a sectional view on line 2—2 of Fig. 1.
Figure 3:
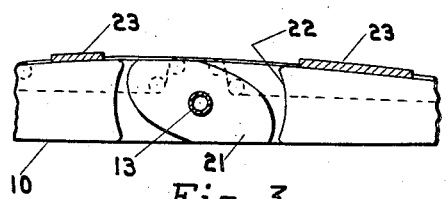
Fig. 3 is a sectional view on line 3—3 of Fig. 1.
Figure 5:
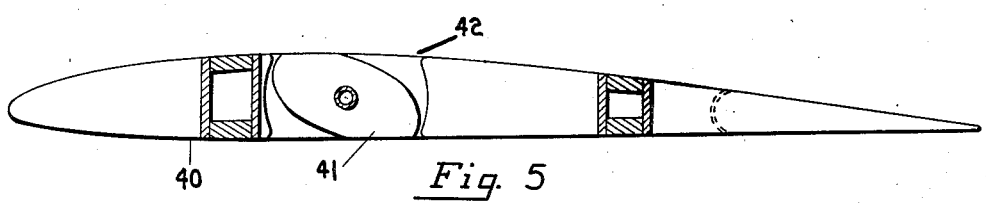

In Fig. 5 the aircraft wing 40 has a spinner 41 in an opening 42 similar to that shown in Figs. 1, 2 and 3, but with the cover omitted.

Figure 6:
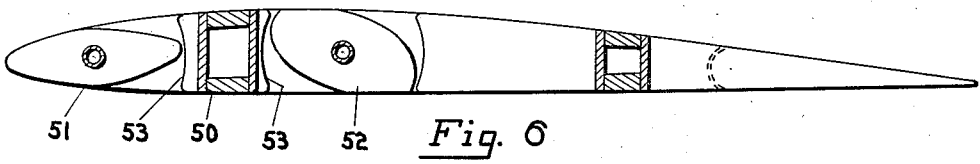

In Fig. 6 the aircraft wing 50 includes a leading edge spinner 51 and an intermediate spinner 52 within the openings 53.

In Fig. 7 the aircraft wing 60 includes intermediate spinners 62 and 63.

In Fig. 8 the aircraft wing 70 includes a leading edge spinner 71 and a trailing edge spinner 72.

Fig. 9 shows another type of spinner 80, mounted on a shaft 81, this spinner 80 being provided with recessed depressions 82 adjacent the maximum diameter of the spinner. This spinner may be used in any suitable position desired.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In combination with an aircraft wing having a slot extending therethrough, a spinner journaled within said slot, said spinner having a minimum diameter whereby it may remain at rest entirely within the contour of the airfoil surfaces of the wing and a maximum diameter whereby it may extend beyond the contour of the airfoil surfaces.

2. In combination with an aircraft wing having a slot extending therethrough, a spinner journaled within said slot, said spinner having a minimum diameter whereby it may remain at rest entirely within the contour of the airfoil surfaces of the wing and a maximum diameter whereby it may extend beyond the contour of the airfoil surfaces, and means controllable by the aircraft operator for holding said spinner at rest at any degree of rotation or for permitting it to spin more or less freely.

3. In combination with an aircraft wing having a slot extending therethrough, a spinner journaled within said slot, said spinner having a minimum diameter whereby it may remain at rest entirely within the contour of the airfoil surfaces of the wing and a maximum diameter whereby it may extend beyond the contour of the airfoil surfaces, means controllable by the aircraft operator for holding said spinner at rest at any degree of rotation or for permitting it to spin more or less frequently, and means controllable by the aircraft operator for covering the slot when the spinner is at rest therein.

4. In combination with an aircraft wing having a plurality of aligned slots extending therethrough, a shaft journaled on said wing extending through said aligned slots, and a spinner fixed on said shaft within each slot, said spinner having a minimum diameter not greater than the thickness of the aircraft wing whereby it may remain at rest entirely within the contour of the airfoil surfaces of the wing and a maximum diameter greater than the thickness of the aircraft wing whereby it may extend beyond the contour of the airfoil surfaces.

5. In combination with an aircraft wing having a plurality of aligned slots extending therethrough, a shaft journaled on said wing extending through said aligned slots, a spinner fixed on said shaft within each slot, said spinner having a minimum diameter not greater than the thickness of the aircraft wing whereby it may remain at rest entirely within the contour of the airfoil surfaces of the wing and a maximum diameter greater than the thickness of the aircraft wing whereby it may extend beyond the contour of the airfoil surfaces, and means for controlling the rotation of the shaft to hold said spinner at rest at any degree of rotation or permit it to spin more or less freely.

6. In combination with an aircraft wing having a slot extending therethrough, a spinner journaled within said slot, said spinner having a minimum diameter whereby it may remain at rest entirely within the contour of the airfoil surfaces of the wing, and a maximum diameter whereby it may extend beyond the contour of the airfoil surfaces, said spinner being located in the leading edge of the aircraft wing.

7. In combination with an aircraft wing having a slot extending therethrough, a spinner journaled within said slot, said spinner having a minimum diameter whereby it may remain at rest entirely within the contour of the airfoil surfaces of the wing, and a maximum diameter whereby it may extend beyond the contour of the airfoil surfaces, said spinner being located in the trailing edge of the aircraft wing.

8. In combination with an aircraft wing having a slot extending therethrough, a spinner journaled within said slot, said spinner having a minimum diameter whereby it may remain at rest entirely within the contour of the airfoil surfaces of the wing, and a maximum diameter whereby it may extend beyond the contour of the airfoil surfaces, said spinner being located in a chord of the aircraft wing intermediate its leading and trailing edges.

DELMER S. FAHRNEY.